Masami Morita
Katsuyasu Takase
INVENTORS

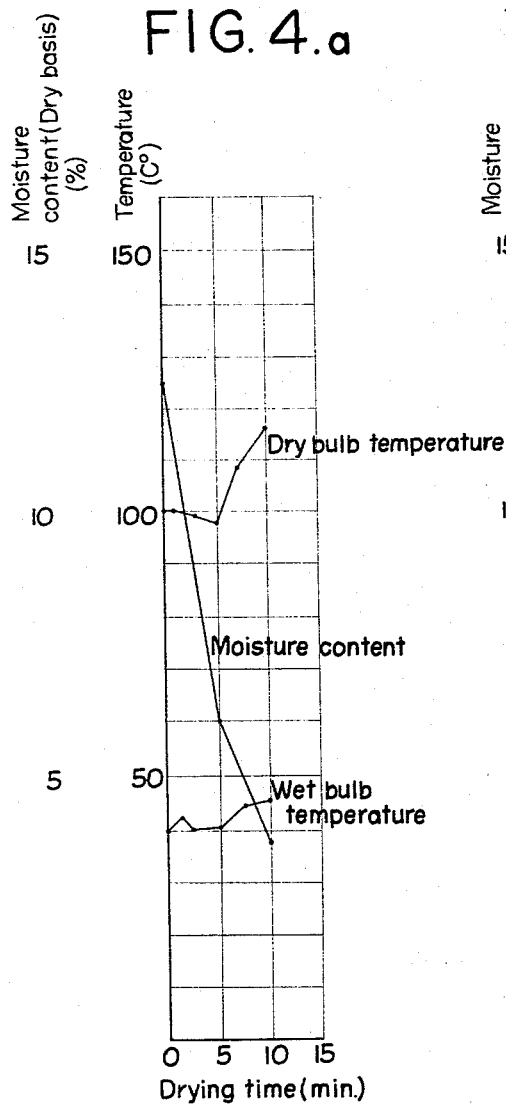
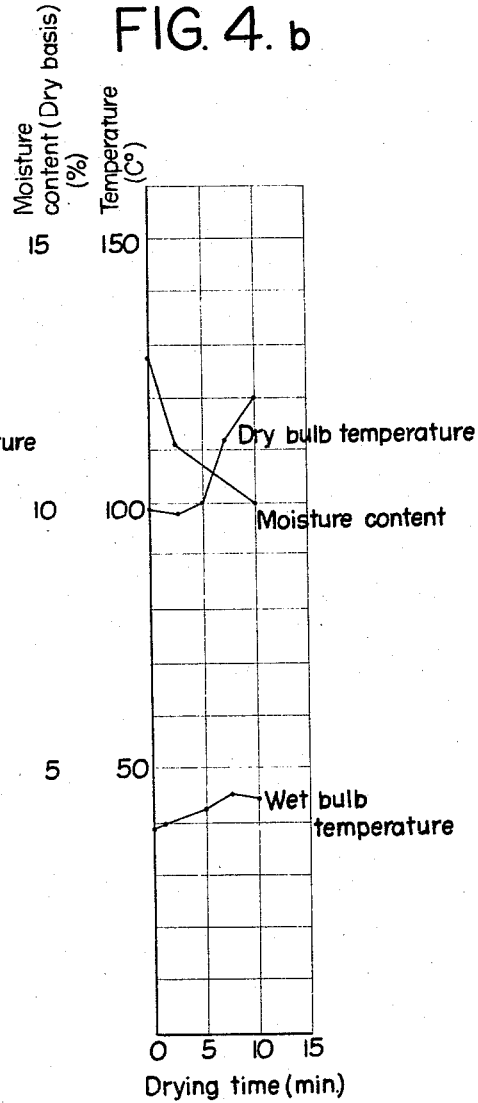

United States Patent Office 3,277,167
Patented Oct. 4, 1966

3,277,167
PROCESS FOR RECOVERING DRIED PHTHALATE FROM AN AQUEOUS SOLUTION OF ALKALI SALTS OF PHTHALIC ACID
Masami Morita, Meguro-ku, Tokyo-to, and Katsuyasu Takase, Shinagawa-ku, Tokyo-to, Japan, assignors to The Futaba Netsukagaku Kenkyujo, Ltd., Minato-ku, Tokyo, Japan
Filed Apr. 25, 1963, Ser. No. 278,510
Claims priority, application Japan, Nov. 28, 1958, 34,036/58
6 Claims. (Cl. 260—525)

This invention relates to a process of drying a solute and more particularly, to a process of drying the solute after the same has crystallized.

This application is a continuation-in-part of United States patent application Serial Number 848,379, filed October 23, 1959, now abandoned.

It is amongst the objects of the present invention to obtain a solute in the form of dried crystals from a readily supercooling type solution.

It is another object of the present invention to obtain a solute in a very dry state from a readily supercooling type solution.

It is still another object of the present invention to obtain a solute in the form of a dry crystalline product of high bulk density from a readily supercooling type solution.

A fuller understanding of the invention and the manner in which its objective and advantages may be realized will become apparent from the following detailed description thereof taken in connection with the accompanying drawings wherein:

FIG. 4a represents the results of a drying test of the crystallized mass.

FIG. 4b represents the results of a drying test of the solid-like supercooled mass.

Figure 1:
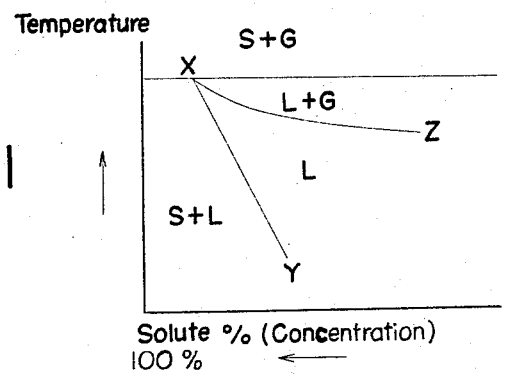
FIG. 1 is a part of the phase diagram in equilibrium when the solution contains only one salt.

Referring to the drawings: In FIG. 1 the ordinate represents temperature, the abscissa solute percentage (concentration). Symbols S, L, and G represent the solid, liquid and gaseous phases, respectively. The curve XY represents solubility, the curve XZ is the boiling curve and point X represents the solute percentage and the temperature at which the solute crystallizes from the boiling solution.

The aqueous salt solutions preferably contemplated by the present invention include solutions which have the following properties: The solubility of the solute is high and the solubility increases with a temperature rise and the solutions are apt to supercool. A part of their phase diagram is represented by FIG. 1.

It should be additionally noted that solutions having the foregoing properties, and additionally, which tend to form a tough skin on their surfaces when exposed to the atmosphere, are particularly suited to the present invention. Aqueous solutions of alkali salts of phthalic acid and of salts of organic hydroxy acids are given as examples of such solutions.

In addition, solutions with said properties include not only the solutions of which the solute consists of one salt as in FIG. 1, but also where the solute consists of several salts and where the solutions contain impurities.

The terms "readily soluble solute" and "readily supercooling type aqueous salt solution" as used herein involves the solutions having said properties and containing the raw materials covered by this invention.

In accordance with this invention, the readily soluble and readily supercooling type aqueous salt solution is treated, in order to prepare the solute as a dried mass, as follows:

(a) Concentrating the solution to a supersaturated state.
(b) Chilling said supersaturated solution to be solidified.
(c) Crystallizing said chilled and solidified material.
(d) Drying said crystallized material.

Figure 2:
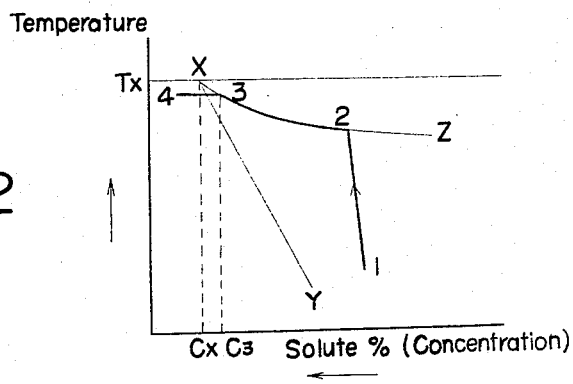
FIG. 2 illustrates the course of concentrating the solution.
Figure 3:
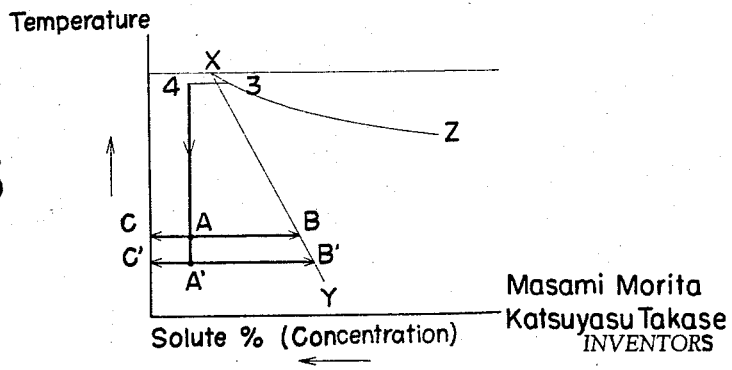
FIG. 3 illustrates the equilibrium relationships on cooling and crystallizing the concentrated supersaturated solution.

These steps are illustrated by FIGS. 2 and 3. In FIG. 2 the bold line represents the concentrating procedure (a). An unsaturated solution of state 1 is heated to boiling point 2 and then the liquid is concentrated to point 3 along the boiling curve XZ. The liquid, thereafter, is concentrated to the supersaturated state 4 along the line 3–4.

Although it is preferable that the moisture content of the concentrated solution 4 should be as low as possible, it is necessary that the concentration might be carried out in a manner which will not cause crystallization of the solute. For those purposes, the concentration is carried out along the line 1–2–3–4 as indicated in FIG. 2, when the solution contains only one solute component. The object of the stage of concentration (a) is to make the solution supersaturated.

To concentrate a solution to a supersaturated state without crystallization, it is important that all stages of concentration are carried out in a manner by which any part of the solution does not pass through point X. Point X is where the solute precipitates as crystals from the boiling solution, namely, the point where solid, liquid and vapor coexist in equilibrium. This point is hereinafter referred to as "the boiling point of the saturated solution." In the cases in which the solutions contain two or more solute components, the concentration should be carried out along a course which does not pass through the point where crystals separate out from boiling solutions, similarly in the case of one solute component represented by FIG. 2.

In order to concentrate the solution to a supersaturated state keeping away from point X, the concentration stage should be divided into two parts, as mentioned above, at the point which corresponds to the concentration $C_3$ adjacent to the concentration $C_x$ illustrated in FIG. 2. $C_x$ represents the concentration of the saturated solution represented by point X.

In the first part of the stage, the preliminary concentration to $C_3$ is efficiently carried out by boiling along 2–3, and in the second part of the stage, the concentration from $C_3$ to a supersaturated state must be carried out by the evaporation from the surface of the concentrated solution along 3–4.

In concentrating by evaporation from the surface of the concentrated solution, the temperature in the evaporator must be kept below temperature $T_x$, the boiling temperature of the saturated solution as illustrated in FIG. 2. Thus, by keeping the temperature of the solution below $T_x$, the solution will be concentrated from 3 to 4 in FIG. 2, or to the supersaturated solution whose moisture content is maintained as low as possible.

Moreover, in this second part 3–4 of the concentration stage, the boiling of the solution ceases and the surface concentration is higher than the bulk concentration, as the concentration is caused chiefly by the evaporation from the surface of the solution. Accordingly, the crystallization may be apt to take place in the surface layer of the concentrated solution. Therefore, following provisions against surface crystallization are needed, for instance, that the surface parts of the solution shall be so mechanically stirred into the solution interior as to prevent excess concentration in the surface layer, and that the evaporator shall be so closed as to retain some of the water vapor evaporated in the atmosphere over the solution surface for preventing excess surface evaporation, or even for redissolving crystals by dews formed on the inside wall of the evaporator lid on falling on the surface of the solution to be concentrated.

In short, the concentration stage is carried out through the entire course to obtain a concentrated supersaturated solution of as low moisture content as possible and at the same time of sufficient fluidity by endeavoring to prevent crystallization.

In the solidification stage (b), by being chilled and solidified, said concentrated solution takes an intrinsically supercooled state to form amorphous solid or so-called glass, as it is characterized by the strong inclination to supercooling, as previously stated.

The method for solidification is in principle that the concentrated liquid solution at said temperature of concentration is transferred by flowing through a pipe line and that the solution is poured on a chilling surface to form a layer to facilitate solidification.

In this case, the temperature of any part of the concentrated liquid solution must be depressed below temperature $T_x$ throughout the pipe line, for example, by a device for keeping the pipe wall temperature below $T_x$.

The crystallization in the concentrated solution is cautiously prevented in said state of concentration (a) as mentioned above. One reason for this is to prevent scale from forming on heat conducting surfaces in an evaporator. The scale decreases the heat conduction rate of the evaporator. Crystals suspended in a solution also make it difficult to stir up the solution as a result of its decreased fluidity, and impede effective and efficient evaporation. In addition, in the stage of solidification (b), it is necessary to keep fluidity of said concentrated supersaturated solution of lowest moisture content possible high enough to permit it to flow without clogging through the pipe line from the evaporator to the apparatus for solidification, and to be poured and solidified with ease in the form of film on the chilling surface.

Next, FIG. 3 may be referred for the illustration of the stage of crystallization (c).

Said concentrated supersaturated solution is cooled from point 4 to point A. At point A the solution substantially forms a solid-like supersaturated liquid phase i.e. an amorphous mass. In this stage (c), crystallization is allowed to occur in said amorphous mass. Namely, quasi solid supersaturated liquid phase which is metastable is converted into a stable mixture of heterogeneous phases i.e. a crystallized mass, which is, in equilibrium, consisted of a solid phase (crystals of the solute) represented by point C and a liquid phase (a saturated solution) represented by point B, as illustrated by FIG. 3. Additionally, it should be noted that said saturated solution is inseparably included among said (minute) crystals and the mass in the whole maintains the form of solid.

In general, the crystallization proceeds from surface to centre of the amorphous mass with a certain linear velocity; thus the stage of crystallization (c) is regarded as an aging procedure. This aging step is the most characteristic in the present invention. After aging and crystallizing the substantially amorphous mass, the material is shifted to the drying stage (d).

The rate of crystallization depends primarily upon the material nature and impurities therein contained. Period of time necessary for the completion of crystallization is referred to as "aging time" and is influenced by several conditions.

Firstly, the decrease in thickness of the solidified mass is advantageous for shortening of the aging time (and also for shortening of drying time), because the distance of the course of crystallization is decreased. However, the solidifying thickness must be considered in connection with material handling problems in the following steps, and is limited by fluidity of the concentrated solution and also by methods or apparatuses for solidification.

Secondly, the increase of supersaturation degree of the concentrated solution is effective for the acceleration of crystallization. This is one of the reasons why we emphasize, as previously mentioned, the necessity of the concentration to supersaturation which decreases moisture content of the solution as low as possible in the stage of concentration (a).

Thirdly, when the surface of the mass which is in supersaturated state is subjected to a friction, crystallization is induced on said surface. This is the reason why the crystallization of the amorphous mass proceeds from surface to centre (from shell to core), because the surface subjected to the friction becomes the starting points of the crystallization. This friction may be applied to the supersaurated phase when it is solidified. For instance: the grazing along the surface of the mass or the scraping off the solidified mass from the chilling surface effects the friction; and when the solidified mass is cut to form pieces for handling and drying convenience, the friction is also applied to the cutting surface. The amorphous mass thus produced and preformed can have a shortened aging time.

Fourthly, temperature controlling of the amorphous mass is effective for the acceleration of crystallization.

The temperature at which the amorphous mass is converted into the crystallized mass is hereinafter referred to as "aging temperature"; whereas the temperature to which the concentrated solution is cooled to be solidified (i.e. the temperature of the solidified mass) is hereinafter referred to as "solidifying temperature." In some cases the aging temperature which is made different from the solidifying temperature may be effective for the acceleration of crystallization.

In general a unit for aging is necessary to intervene between the solidifying unit and the drying unit, whether the aging temperature is made different from the solidifying temperature or not; while in a few cases the crystallization may be completed during the period of time necessary for transferring the material from the solidifying apparatus to the dryer. Aging is performed in conventional equipment well known in the art.

Next, the crystallized mass in said stage (c) is dried in the stage of drying (d).

The crystallized mass contains the liquid phase of saturated solution; the liquid is, however, included in the form of very thin films among the minute solute crystallites and said mass can be handled as solid, as previously described. That is to say, the concentration (a) should be achieved to the degree of low moisture content which permits the crystallized mass to be handled easily as a solid material in the stage of drying (d). The drying of the crystallized mass is nothing but the drying of the saturated solution included among crystallites, and is an easier procedure as compared with the drying of the solidlike supercooled mass (the amorphous mass).

The reason is that: in general, the more a solution is concentrated, the lower is vapor pressure of a solvent, in a solute solvent system; when the solute crystallizes out from the solidlike supersaturated mass (the amorphous mass) of a certain concentration, and when the saturated solution of a lower concentration is separated, the material obtains a higher vapor pressure than when it remains supersaturated; thus the material when converted into the crystallized mass becomes easier drying.

Because of high solubility of the solute and besides of supersaturation, the materials preferably contemplated by the present invention have far lower vapor pressure than that of ordinary materials. In this case, the drying is difficult by its very nature. Said materials are apt to absorb moisture and deliquesce, instead of being allowed to dry, in the atmosphere of ordinary temperature. Even a slight increase of vapor pressure of the materials due to the completion of crystallization in accordance with this invention, is apparently noted to be effective for such difficult drying as mentioned above to make by far easier and more efficient.

Further, when the material to be dried is allowed to crystallize at a lower temperature, that is to say, when the material separates into a solid phase and a liquid phase in equilibrium at a lower temperature, said liquid phase has a lower concentration. With reference to FIG. 3, the concentration of the separated liquid represented by point B' is lower than that represented by point B. When each liquid represented by point B' and point B respectively is heated in the current of the air at a same temperature and humidity, the liquid of lower concentration represented by point B' exhibits a higher vapor pressure than that of the liquid of higher concentration represented by point B, and therefore the former will be more easily evaporated. From this the material crystallized at a lower temperature may be easier drying.

On the other hand, when the crystallized mass is heated with the air at a certain high temperature, the temperature of said mass is increased to the same temperature as that of the air in the course of drying. Accordingly, equilibrium relations between solid phase and liquid phase is shifted and the concentrations of the liquid part increase with the temperature rises of the mass. The mass tends to become slower drying; and tends to become soft or lose its solidity unless the drying is effectively achieved, because the ratio of solid to liquid decreases with the temperature rise of the mass.

We observed a case where the drying rate in the initial period of drying cycle became more increased when the temperature of the mass which had been elevated above the solidifying temperature for the purpose of shortening the aging time was, after the completion of crystallization, again lowered, than when said elevated aging temperature was maintained up to the commencement of the drying stage.

However, it should be noted that, in general, the most advantageous aging temperature for the acceleration of crystallization depends on the material nature, and therefore the temperature controlling mode during the preliminary courses before the drying stage shall also be influenced by the material nature.

At any rate, in some cases, it may be necessary and effective for the efficient carrying out of the entire process that the three sorts of temperature—the solidifying temperature, the aging temperature, and the temperature of the material before the drying procedure—are so controlled as to be correlated to one another depending on the material nature.

Now as for the drying stage, the crystallized mass is heated in the current of the air, whose temperature should not exceed temperature $T_x$ during the initial stage of drying. This initial heating temperature shall be suitably chosen depending on the degree of concentration or the initial moisture content of the material to be dried, and also on the type of dryer.

At this initial temperature of the air, with the consideration of relative humidity of the air as well, the moisture content of the material will be decreased at a high rate. This initial period of drying cycle plays a very significant role in the entire drying procedure.

After the moisture content of the material has fallen adequately in the initial drying course, the temperature of the air is increased for the acceleration of drying. In other words, heating temperatures are needed to be elevated in the following periods of drying cycle, because, during the initial period of drying cycle, the temperature of the material is raised and the concentration of liquid phase in the material is increased with the result of lowered vapor pressure in the material to be dried. It must be remarked in addition that the material will not soften or melt at higher heating temperatures, because the moisture content of the material has been reduced sufficiently and accordingly the ratio of liquid to solid in the material has been decreased. If the moisture content remained unchanged, the rise of the temperature of the material would cause the increased ratio of liquid to solid and the material would soften or melt. It is the reason why the material should be effectively dried in the initial period of drying cycle, as described above.

At last in the final period of drying cycle, heating temperature can be elevated above temperature $T_x$ so as to obtain excessively low final moisture content of the dried product.

In contrast with the crystallized material, when the amorphous mass is heated under the same conditions of the air, the drying rate is made much lower during the initial period of drying cycle and, in addition, the decrease in the moisture content almost ceases soon after the beginning of heating. (Moreover the initial heating temperature is usually needed to be lowered compared with the case of drying the crystallized mass, because the amorphous mass is more apt to soften at high temperatures.)

When the heating temperature is unreasonably elevated with the desire for increasing the drying rate before the sufficient lowering of the moisture content is attained, the material softens or melts in a dryer, and if the heating temperature is elevated above $T_x$ in this case, the boiling occurs in the mass with a result of the blowing of the mass, and thereby the bulk density of the dried product is exceedingly lowered. The result is that the drying stage is met with difficulty and inefficiency and, what is worse, both the degree of dryness and the quality of the product are inferior.

FIG. 4a and FIG. 4b represent an example of the comparison between a result of a drying test of the crystallized mass and that of the solidlike supercooled mass i.e. amorphous mass. The comparison is especially intended to be made for the early periods of drying cycle and the illustration of the final periods of drying cycle is omitted both in FIG. 4a and in FIG. 4b.

FIG. 4a represents the abridged result of the drying test of alkali phthalate after aging at ordinary temperature for five hours for complete crystallization.

FIG. 4b represents the abridged result of the drying test of a sample similarly prepared but without aging, under the almost same drying conditions as in FIG. 4a.

The sample tested and illustrated in FIG. 4a is referred to as sample a, and the sample tested and illustrated in FIG. 4b is referred to as sample b. The sample a was dried as the crystallized mass, whereas the sample b was dried as the solid-like supercooled mass i.e. amorphous mass.

It will be apparently noted that, in the initial period of drying cycle, the sample a was dried decidedly far faster than the sample b; in first five minutes, the moisture content was lowered to 6.0% in the sample a, while only to about 10.7% in the sample b.

FIG. 1 is a phase diagram of a dipotassium phthalate system, point X being the boiling point of the saturated solution. At point X, the solution having solute content of about 85% or water content of about 15% boils at about 130° C. under 1 atm. and precipitates crystals therefrom. Concentration of solution is expressed here as water content.

The curve XY in FIG. 1 is the solubility curve. In equilibrium, the saturated solution at 65° C. has water content of about 20%. The saturated solution at the boiling point of the saturated solution, i.e. about 130° C., has the lowest water content i.e. about 15%, among the saturated solutions.

The curve XZ in FIG. 1 is the boiling curve. The solution having water content of 20% boils at about 118° C. The highest boiling temperature appears at the boiling point of the saturated solution, i.e. about 130° C.

Dipotassium phthalate is very soluble in water; concentrated solution of this salt is highly viscous and liable to form a skin on the surface upon heating.

Aqueous solution of dipotassium phthalate is most distinguished by its extraordinary supercooling nature; it yields glassy state.

Behaviors in crystallization of this salt were observed as follows:

A 20% water content solution at 80° C. (saturation temperature 65° C.) contained in a closed glass tube of 5 mm. dia. was immersed in a cooling bath at 10, 0, —15, and —40° C., respectively. In every case the solution remained clear for about 30 min. after immersion. At —40° C. the solution turned glassy. After standing at room temperature for 2 days, the solution cooled at —15° C. formed spherulites of about 3 mm. dia. occupying about one-half the volume of container.

A 16% water content solution at 120° C. (saturation temperature 110° C.) was cooled similarly at various temperatures between 0 and 80° C. At a cooling temperature 80° C., no appreciable formation of nuclei occurred; the solution required a great amount of about 30° supercooling before crystallizing. At a cooling temperature 60° C., spherulites began to appear a few min. after immersion. When cooled at room temperature, the solution remained clear for several min.; it takes about 10 hours for spherulites to cover all the volume of container.

The features of crystallization of this salt are known as follows:

No simultaneous crystallization occurs upon cooling; the separation of crystals from mother liquor are found to be difficult or impossible, because the mother liquor becomes very viscous.

With a 16% water content solution, number of nuclei formed and rate of crystal growth were measured as shown in Table 1.

TABLE 1

| Temperature, ° C. | Number of nuclei formed in 1 cm.³ of solution | Rate of crystal growth for spherulite, mm./min. |
| --- | --- | --- |
| 80 | *0 | 0.06 |
| 60 | 15 | †0.10 |
| 25 | †70 | 0.02 |
| 0 | 25 | *0 |

*Nearly. †Maximum.

The values for rate of crystal growth as well as for nucleation are found small; the optimum temperature for nucleation is found to be considerably lower than that for maximum crystal growth; these facts illustrate that aqueous solution of this salt will supercool readily and will yield glassy state or amorphous mass.

Because the solution can readily be supercooled, it will also, by evaporation, be concentrated to a considerably supersaturated state. We could concentrate the solution to about 10% water content by evaporating it at about 120° C. The concentration was carried out in the manner as previously described; the evaporator was a jacketed kettle covered with a dome and provided with stirrer; the heating was controlled so that the temperature of the solution remains below the boiling point of the saturated solution, i.e. 130° C.

The supersaturated solution thus obtained was viscous, but could be allowed to flow through a piping. When the temperature of the solution was raised to 130° C. however, fluidity of the solution was lost suddenly owing to the precipitation of crystals from the boiling solution; stirring could no more be performed; the concentration could no more be continued.

Unsaturated solution may be evaporated by boiling without crystallizing. A starting solution having 30% water content was concentrated preliminarily to about 20% water content by boiling it at temperatures between 113 and 118° C.

The supersaturated solution at about 120° C. having about 10% water content was cooled to about 40° C. on a cooling drum, and obtained in the form of solid flakes about 3 mm. thick. The solidified mass was brittle and very hygroscopic.

After the flakes thus obtained were allowed to stand at room temperature for several hours in a desiccator, they became less hygroscopic; they turned flexible; we could, under microscope, detect needle-like crystals several microns long.

The solidified mass first obtained upon cooling was substantially a supercooled liquid or an amorphous mass; the amorphous mass was converted into a "crystallized mass"; i.e. crystallization was caused to occur in the quasi solid supercooled liquid while it was allowed to stand.

We also observed that the conversion took place layer by layer from the surface to the center of the flakes. It took about 4 hours at 17° C. for the conversion of the amorphous mass 3.2 mm. thick and containing 10% water to be completed. When the flakes of the same water content and of the same thickness were maintained at 50° C., the conversion was completed in about 2 hours.

Nucleation might possibly be induced within the surface by mechanical shock or friction given by the cooling drum; the surface might possibly be cooled to nearest the optimum temperature for nucleation; crystallization would surely take place with a rate of crystal growth determined by the temperature at which the mass was maintained; by increasing this temperature the period of time required for the completion of conversion could be shortened.

An act which maintains an amorphous mass for a definite period of time at a definite temperature to convert it into a crystallized mass is referred to as "aging"; a temperature at which aging is carried out is referred to as "aging temperature"; a period of time required for aging is referred to as "aging time."

Cooling temperatures favorable to solidification will be desired at the same time to be favorable to nucleation. Cooling temperatures favorable to nucleation, however, will make aging time elongated; for optimum temperature required for maximum crystal growth are found to be much higher (35°) than that for nucleation as shown in Table 1.

By increasing the temperature at which supersaturated solution was solidified, or by solidifying the same at a cooling temperature moderately higher than optimum temperature for nucleation and maintaining the same temperature as cooling temperature, aging time can considerably be shortened.

A higher aging temperature, however, will make crystallized mass slower drying owing to higher concentration of saturated solution separated; nevertheless a higher aging temperature can also produce stiffer crystallized mass owing probably to larger size of crystals formed. The stiffness of crystallized mass cannot be overlooked in view of material handling properties for drying process, especially for so-called through-circulation drying. The stiffness depends, in the first place, on water content; better stiffness can basically be obtained by lower water content; for this determines, at a given temperature, the mass ratio of solid (crystals) to liquid (saturated solution). Besides a higher aging temperature will reduce stiffness of crystallized mass unless otherwise caused to occur; for the mass ratio, at a given water content, decreases with increasing temperature. Actually a considerably increased aging temperature was proved to give better stiffness to a crystallized mass, which was obtained from less concentrated solution.

Aging temperature (as well as cooling temperature) shall be selected under the consideration over above described matters; the aging step will require a definite period of time during which the conversion of amorphous mass into crystallized mass will be allowed to complete with a certain rate of crystal growth determined by the selected aging temperature.

Crystallized mass was found to be an intimate and inseparable mixture consisting of crystals and a saturated solution at an aging temperature; it should keep its solidity or stiffness after conversion.

The results of our drying experiments for crystallized mass versus amorphous mass are shown in FIG. 4a and FIG. 4b. The employed salt was dipotassium phthalate; the solution was concentrated to about 11.5% water content in this case and solidified at about 30° C. to form flakes 3 mm. thick; aging was carried out at room temperature for 5 hours; the type of drying was that of "through-circulation."

As shown in FIG. 4a, moisture content (dry basis) of the crystallized sample a was decreased by about 3.3% for the period of 2½ min. after the start of heating at 100° C. FIG. 4b shows that fall in moisture content (dry basis) of the amorphous sample b was lessened to only about 1.7% for the same heating period at the same temperature. Moreover the sample b became soft at the end of the period of 2½ min. after the start of heating; drying rate in the following heating course was decreased considerably; the mass was caused to melt when heating temperature was increased to 120° C.; the process could no more be continued.

Naturally the sample b was caused to return to original state, i.e. supersaturated liquid, upon heating because it was simply supercooled liquid; sudden decrease in drying rate appeared after 2½ min. can be attributed to casehardening caused by a tough skin formed on the surface of resulting liquid, which can, in turn, be attributed to the supercooling nature of the solution.

On the contrary the sample a could be dried with ease to about 0.2% moisture using higher heating temperatures 120 to 150° C. in the following cycle not shown in FIG. 4a. The product obtained had a bulk density of about 0.9 in pulverized state.

Casehardened pieces of amorphous mass may be dried by heating them at the boiling point of the supersaturated solution; the product thus obtained, however, will possess a small bulk density owing to the blowing of water vapor.

High bulk density as well as low moisture content of the dried product of dipotassium phthalate was desired as an essential requisite for the process of this invention; for this organic salt shall be heated as a solid at a considerably high temperature, e.g. about 400° C., in order to convert it into the salt of isomeric acid.

Spray drying and drum drying of an aqueous solution of this salt had been proved to obtain merely a product of bulk density 0.2 to 0.3 and less than 0.4, respectively.

We did not prefer the drying as a liquid, but the drying as a solid. Crystals of this salt, however, could not be obtained by usual methods of separation by crystallization. We preferred crystallized mass as a material to be dried. In order to obtain a seemingly solid crystallized mass, the preliminary three steps were established according to the very nature of the solution as follows:

(a) Evaporating the solution to a supersaturated state so that a low moisture content of the concentrate can be obtained, (b) Cooling said supersaturated solution to effect the solidification substantially resulting in an amorphous mass, (c) Aging said amorphous mass to convert it into a crystallized mass.

The following are examples of the present invention as applied to aqueous solution of dipotassium phthalate.

Example 1

A starting solution having about 30% water content was concentrated preliminarily by boiling it to about 20% water content and further concentrated at about 120° C. to a supersaturated state where its water content was 9.5%. Thus about ¾ of the water contained in the starting solution was removed.

The resulting concentrate having good fluidity was cooled to about 40° C. on a pair of revolving cooling drums with scrapers to obtain solid flakes about 3 mm. thick.

The resulting amorphous flakes were converted into crystallized flakes by aging them for 2 hours at about 40 to 50° C. The crystallized flakes kept good solidity.

The crystallized mass thus produced was fed in a through-circulation continuous dryer consisting of three compartments, and dried to about 0.2% water content for a total drying period of 40 min. Water content was decreased to about 5% for 10 min. at 110° C. in the first compartment, to about 1.5% for 10 min. at 125° C. in the second compartment, to about 0.2% for 20 min. at 150° C. in the last compartment. The dried product possessed a bulk density of about 0.95.

Example 2

Starting solution was the same as that for Example 1. It was concentrated similarly to 11.2% water content. The concentrate was cooled at about 50° C. to form flakes about 3 mm. thick. Aging was carried out for 2 hours at about 50 to 60° C.

The crystallized flakes thus produced were dried in the same dryer as that for Example 1, under the same conditions of temperature as those for Example 1, to about 0.2% water content for a total drying time of 50 min. Bulk density of product was measured 0.90.

The process of this invention has the following remarkable features and advantages in comparison with the processes heretofore known.

The method for drying a solution which has been generally used heretofore is to spray dry the solution, or to dry it with a heated drum.

By these methods, however, the dried product, especially for materials contemplated by this invention, will be obtained in the form of hollow particles or flakes and accordingly will have low bulk density.

In spray drying, a tough skin formed on the surface of the liquid drops, which is especially liable to form in the case of the solutions related to the present invention, will cause expansion or blowing of the drops due to the vaporization of the liquid interior, because heat transfer rate to the drops attains to very high value.

In addition, the dust recovery in spray drying will offer a particular troublesome problem because the dried powder is very hygroscopic.

Also in the case of drum drying, bulk density of the dried product so far related to this invention will be decreased in nearly similar manner with spray drying, and besides it is difficult in general to obtain high degree of dryness by drum drying.

In short, when the material contemplated by this invention is dried according to the usual methods above mentioned, the products obtained by these methods will never satisfy said requirements of quality, namely, high bulk density and low final moisture content. Even if said requirements of quality of the product by said usual methods might be hoped to be improved to a little degree, the equipments should be complicated or enlarged and the operations should, with much difficulties, be strictly controlled.

On the contrary, the method of this invention as described above in detail has not only the advantage that, the dried product can be obtained with ease as a solid, not hollow, one and accordingly bulk density of the product is higher by far (twice or three times in a certain case) than that with said usual methods, but also the advantage that the final moisture content of the product might easily be lowered to an excessive value.

The reason is that: in accordance with the method of this invention, the concentrated supersaturated solution is once chilled and solidified, and the material to be dried is, in this case, the solidified and aged pieces which have relatively thick sections compared with sprayed drops or films formed on a heated drum and have an internal structure consisting of crystallites filled with liquid; in the drying stage, heat is applied to said pieces from the surface toward centre at a relatively low transfer rate, and heating temperatures can be controlled corresponding to the lowering of the moisture content of the material to be dried, as previously described; thus, it is possible to make the drying procedure reasonable for the properties of the material.

Moreover, it may be another advantage of the method of this invention, in comparison with that of spray drying and drum drying, that the dried product of very hygroscopic nature can be obtained in the form having relatively large sections and accordingly relatively small surface areas.

In addition, the important feature of the method of this invention is the concentration by evaporation of the solution to a supersaturated state of high fluidity by preventing the crystallization.

After said supersaturated solution has been chilled for solidification and converted into a crystallized mass, the drying step is applied to said crystalline mass. In this respect, the process of this invention differs from usual methods of drying crystals which is caused to crystallize out in the solution by means of evaporation or cooling and then is obtained by mechanical separation from the mother liquor.

When the crystallization occurs during the concentration by evaporation of the solutions which have high solute solubility and have readily supercooling and additionally skin forming properties as previously described, said solutions become suddenly viscous and undergo a change to extremely sticky mass as the moisture content is lowered. The solutions can be stirred up only with difficulty or cannot be stirred up, and these make it impossible to continue the concentration. In addition, the handling of the concentrated mass will offer very troublesome problems.

It should be understood that the remarkable features and advantages of this invention reside in the concentration stage wherein, by the best use of the readily soluble and readily supercooling properties and by the effective prevention from crystallization, said salt solution is concentrated to the supersaturated state of lowest moisture content possible.

What is claimed is:

1. A process for recovering a phthalate in crystalline form from an aqueous solution of alkali salts of phthalic acid comprising heating said solution to increase its concentration until a supersaturated solution is obtained with substantially no crystallization of solute occurring, cooling said supersaturated solution to form an amorphous mass, aging said amorphous mass until a crystalline mass is formed and thereafter drying said crystalline mass.

2. The process in accordance with claim 1 wherein the phthalate is dipotassium phthalate.

3. A process for recovering dipotassium phthalate in crystalline form from an aqueous solution of the same comprising heating said solution to increase its concentration until a supersaturated solution is obtained by controlling said heating so that the temperature of the solution remains below the temperature of the boiling point of the saturated solution so that substantially no crystallization of solute occurs, cooling said supersaturated solution to form an amorphous mass, aging said amorphous mass until a crystalline mass is formed, drying said crystalline mass by heating the same initially at a temperature not exceeding the temperature of the boiling point of the saturated solution.

4. A process in accordance with claim 3 where the temperature employed during the final stages of drying exceeds the temperature of the boiling point of the saturated solution.

5. A process for recovering dried crystals of dipotassium phthalate from an aqueous solution of the same comprising concentrating said solution to a point where its water content is about 9–12% substantially without crystallization by maintaining the temperature of the solution below the temperature of the boiling point of the saturated solution, cooling the now supersaturated solution to about 20–50° C. to form an amorphous mass, converting said amorphous mass into a crystallized mass by maintaining the temperature of the mass at about 20 to 70° C., drying said crystallized mass by heating, initially at a temperature below that of the boiling point of the saturated solution and finally at a temperature which exceeds that temperature.

6. A process for recovering dipotassium phthalate in crystalline form from an aqueous solution of the same comprising heating said solution to increase its concentration until a supersaturated solution is obtained by controlling said heating so that the temperature of the solution remains below the temperature of the boiling point of the saturated solution so that substantially no crystallization of solute occurs, solidifying the resulting supersaturated solution in a flaky form by depositing the same on a cooled surface to form an amorphous mass, aging said amorphous mass at the temperature at which it is solidified to convert it into a solid mass, and thereafter heating said solid mass to effect the removal of liquid, initially at a temperature below the temperature of the boiling point of the saturated solution.

References Cited by the Examiner

UNITED STATES PATENTS

| | | | |
|---|---|---|---|
| 2,118,272 | 5/1938 | Smith | 23—126 |
| 2,962,361 | 11/1960 | Spiller et al. | 260—524 |
| 3,029,278 | 4/1962 | Spiller et al. | 260—524 |
| 3,102,137 | 4/1963 | Wise et al. | 260—525 |

LORRAINE A. WEINBERGER, *Primary Examiner.*

S. B. WILLIAMS, *Assistant Examiner.*